US010071769B2

(12) United States Patent
Kim et al.

(10) Patent No.: US 10,071,769 B2
(45) Date of Patent: Sep. 11, 2018

(54) FRONT VEHICLE BODY REINFORCING STRUCTURE

(71) Applicants: Hyundai Motor Company, Seoul (KR); Kia Motors Corporation, Seoul (KR)

(72) Inventors: Do Hoi Kim, Anyang-si (KR); Chang Ho Park, Suwon-si (KR); Ji Woong Park, Hwaseong-si (KR); Chan Young Kang, Gunpo-si (KR); Hae Woong Kim, Seoul (KR); Min Soo Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 17 days.

(21) Appl. No.: 15/334,538

(22) Filed: Oct. 26, 2016

(65) Prior Publication Data

US 2017/0369102 A1  Dec. 28, 2017

(30) Foreign Application Priority Data

Jun. 24, 2016 (KR) .................. 10-2016-0079560

(51) Int. Cl.
| | | |
|---|---|---|
| *B62D 21/15* | (2006.01) | |
| *B62D 25/08* | (2006.01) | |
| *B62D 25/14* | (2006.01) | |

(52) U.S. Cl.
CPC ......... *B62D 21/152* (2013.01); *B62D 25/082* (2013.01); *B62D 25/085* (2013.01);
(Continued)

(58) Field of Classification Search
CPC .... B62D 21/152; B62D 21/157; B62D 25/08; B62D 25/082; B62D 25/085; B62D 25/088; B62D 25/14
(Continued)

(56) References Cited

U.S. PATENT DOCUMENTS

| | | | |
|---|---|---|---|
| 8,240,747 B2* | 8/2012 | Kim ...................... | B62D 25/081 296/192 |
| 2005/0067858 A1* | 3/2005 | Suh ....................... | B62D 25/088 296/192 |
| 2016/0272253 A1* | 9/2016 | Yoshida ................. | B62D 25/14 |

FOREIGN PATENT DOCUMENTS

| | | |
|---|---|---|
| KR | 10-2012-0051539 A | 5/2012 |
| KR | 10-2015-0107308 A | 9/2015 |
| WO | WO 2011/055695 A1 | 5/2011 |

* cited by examiner

*Primary Examiner* — Jason S Daniels

(74) *Attorney, Agent, or Firm* — Morgan, Lewis & Bockius LLP

(57) ABSTRACT

A front vehicle body reinforcing structure may include a dash panel, a front side member extending along a length direction of a vehicle for coupling to a lower part of the dash panel, a fender apron member extending along the length direction of the vehicle and coupled to an upper part of the dash panel, a front shock absorber housing having a lower part coupled to the front side member and an upper part coupled to the fender apron member, a cowl cross member extending along a width direction of the vehicle for coupling to the upper part of the dash panel and having both ends overlapping and coupled to the front shock absorber housing along the width direction, and a front shock absorber housing side member adhered to an inner surface of the front shock absorber housing, and having an upper part coupled to the cowl cross member.

7 Claims, 5 Drawing Sheets

(52) U.S. Cl.
CPC ........... *B62D 25/088* (2013.01); *B62D 25/14* (2013.01); *B60Y 2306/01* (2013.01)

(58) Field of Classification Search
USPC .......................... 296/193.02, 193.09, 203.02
See application file for complete search history.

FRONT VEHICLE BODY REINFORCING STRUCTURE

CROSS-REFERENCE TO RELATED APPLICATION

The present application claims priority to Korean Patent Application No. 10-2016-0079560, filed Jun. 24, 2016, the entire contents of which is incorporated herein for all purposes by this reference.

BACKGROUND OF THE INVENTION

Field of the Invention

The present invention relates to a front vehicle body reinforcing structure. More particularly, to a front vehicle body reinforcing structure connecting a front shock absorber housing and a cowl cross member and connecting a side sill and a front side lower member through a dash side lower member to improving a front collision response performance of a vehicle.

Description of Related Art

Generally, the front vehicle body of a vehicle is a structure of frame that forms an engine room that is located in the front along the length direction of a vehicle, and includes a front end module forming the front part of engine room and equipped with a cooling module and a head lamp, etc., a front fender apron member forming both of the left and right part of engine room and preparing the space for wheels as well as a suspension system, a dash panel that is located in the rear of engine room and sections between the cabin and the engine room, a front side member that is extendedly formed along the length direction of a vehicle in the lower part of engine room and disposed at the both left and right parts along the width direction to correspond to a front collision, and a sub-frame for supporting and mounting a suspension system as well as an engine that is installed in the engine room and a transmission, and so on.

If the vehicle having the aforementioned front vehicle body collides with a front obstacle, the front side member first absorbs impact energy while being deformed by receiving impact, if the collision continues, the fender apron member also absorbs impact energy while being deformed by receiving the impact.

The impact applied to the front side member generates a moment to rotate the vehicle body in an anticlockwise based on a mass center point of the vehicle, an external force that presses the vehicle body from the top to the bottom in the height direction of the vehicle acts on the front suspension due to this moment, in contrast, the external force that raises the vehicle body from the bottom to the top in the height direction of the vehicle acts on the rear suspension, a so-called dipping phenomenon in which the front portion of the vehicle according to the length direction of the vehicle sinks to the ground side is generated due to the moment.

This dipping phenomenon, for example, disturbs an optimization movement of an air back when a front collision accident of the vehicle is generated such that a collision safety of passengers deteriorates.

Accordingly, a front vehicle body improvement structure protecting more securely the passengers by reducing the dipping phenomenon when the collision accident of the vehicle is generated and effectively corresponding to the front collision is needed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body reinforcing structure reducing the dipping phenomenon when the front collision accident of the vehicle is generated to improve the collision stability of the passenger and suppressing the excessive deformation of the front vehicle body by an appropriate dispersion of the impact energy.

According to various aspects of the present invention, a front vehicle body reinforcing structure may include a dash panel partitioning an engine compartment and a passenger room, a front side member extending along a length direction of a vehicle for coupling to a lower part of the dash panel, a fender apron member extending along the length direction of the vehicle and coupled to an upper part of the dash panel, a front shock absorber housing having a lower part coupled to the front side member and an upper part coupled to the fender apron member, a cowl cross member extending along a width direction of the vehicle for coupling to the upper part of the dash panel and having both ends overlapping and coupled to the front shock absorber housing along the width direction of the vehicle, and a front shock absorber housing side member adhered to an inner surface of the front shock absorber housing along the width direction of the vehicle, and having an upper part coupled to the cowl cross member.

A front pillar extendedly formed in a height direction of the vehicle may be coupled to the fender apron member and the dash panel.

One end of a front side member rear lower part extendedly formed to the front side member may be coupled to the lower part of the front pillar.

A cowl side outer member may be coupled to an outer side surface of the fender apron member along the width direction of the vehicle, and the cowl side outer member may be connected to the front pillar.

An arched vehicle body structure may be formed by the front side member rear lower part and the front pillar, the fender apron member, and the cowl side outer member.

A side sill extendedly formed along the length direction of the vehicle may be coupled to the lower part of the front pillar along the height direction of the vehicle.

A dash side lower member may be coupled to a rear surface of the dash panel along the length direction of the vehicle.

The dash side lower member may be formed in a "Y" shape.

A first end of the dash side lower member may be coupled to the side sill, and a second end of the dash side lower member overlaps a part to which the front side member is coupled to the dash panel for coupling to the dash panel.

The vehicle body structure of a ring shape may be formed by sequentially connecting the front pillar and the dash side lower member, the front shock absorber housing, and the fender apron member.

According to the front vehicle body reinforcing structure according to various embodiments of the present invention, the shock absorber housing is coupled to the upper part of the front side member, the cowl cross member formed to be extended along the width direction of the vehicle is coupled to the upper part of the front shock absorber housing, and the cowl cross member is coupled to the fender apron upper member formed to be extended along the length direction of the vehicle, when the front collision or the small overlap collision accident of the vehicle is generated, the impact energy transmitted to the front side member is dispersed to the cowl cross member and the fender apron member through the front shock absorber housing, thereby preventing the excess deformation of the vehicle body by the appropriate dispersion of the impact energy and more surely protecting the passenger by reducing the dipping phenomenon.

Also, as the cowl side outer member and the front pillar and front side member rear lower part are connected with the arched shape, when the front collision or the small overlap collision accident of the vehicle is generated, the front pillar rear lower part is pulled upward in the height direction of the vehicle, thereby effectively reducing the dipping phenomenon.

Furthermore, as the front pillar lower part is connected to the side sill and the front pillar rear lower part is connected to the side sill via the dash side lower member, when the front small overlap collision accident of the vehicle is generated, a tearing of the vehicle body flange by the tire is prevented, and the dash side lower member, the dash panel lower part, and the front side rear lower part form a cross-sectional of a closed-box shape, thereby effectively corresponding to the small overlap collision.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
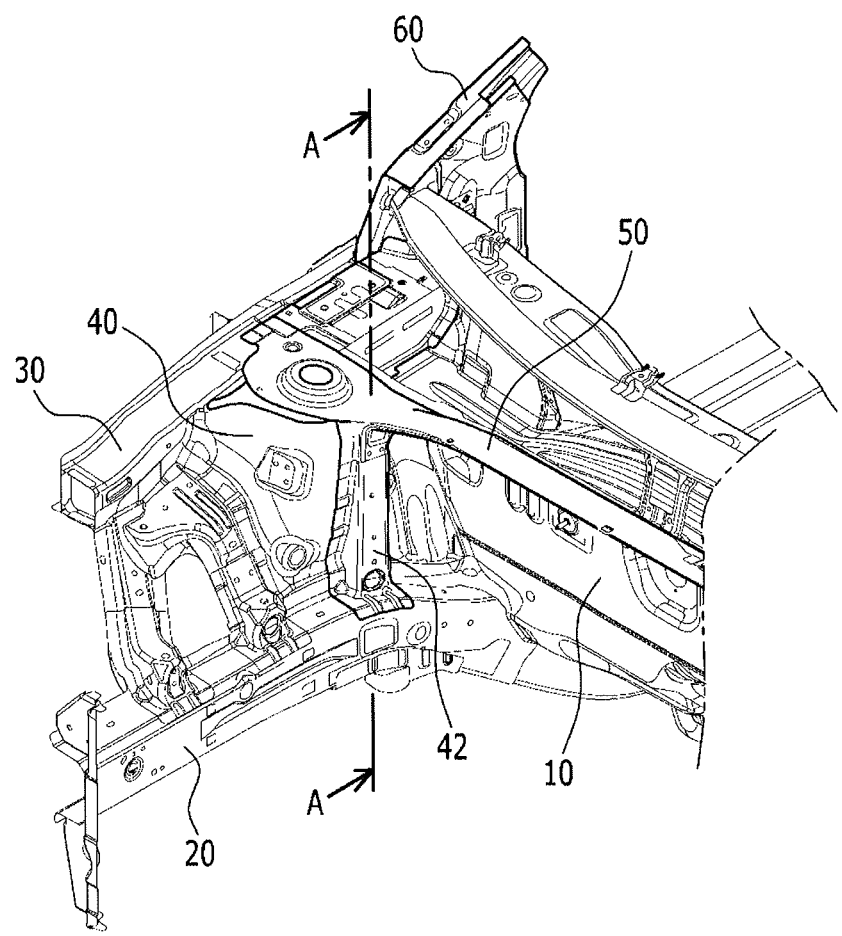
FIG. 1 is a partial perspective view of a front vehicle body reinforcing structure according to various embodiments of the present invention.
Figure 2:
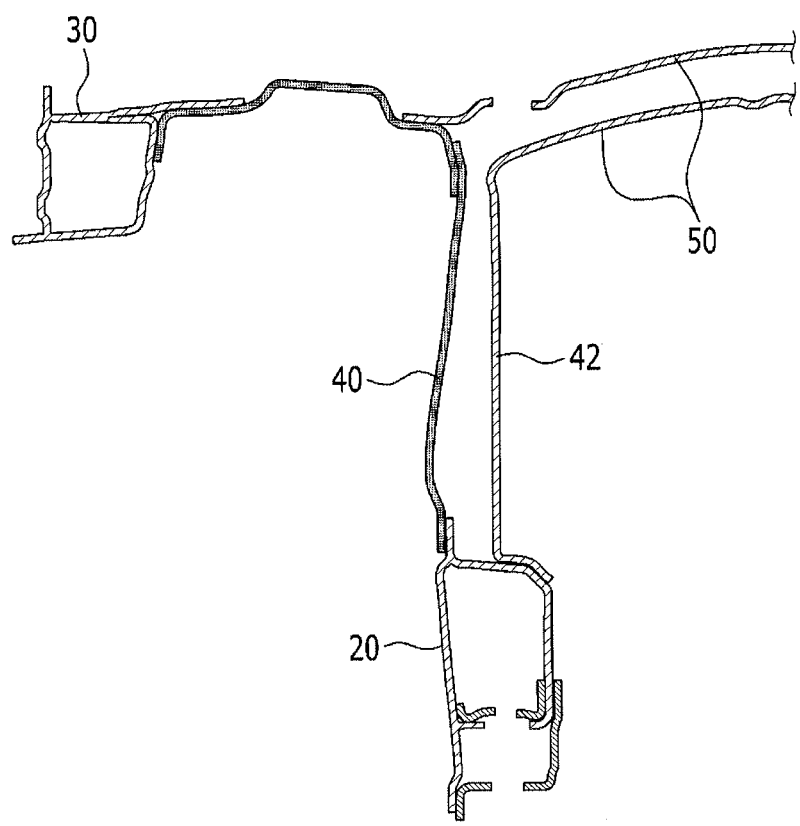
FIG. 2 is a cross-sectional view taken along a line A-A of FIG. 1.

Referring to FIG. 1 and FIG. 2, a front vehicle body structure according to various embodiments of the present invention may include a dash panel 10 formed in a width direction and a height direction of the vehicle to be extended for partitioning an engine compartment and a passenger room.

A front side member 20 formed along the length direction of the vehicle to be extended may be coupled under the dash panel 10, and a fender apron member 30 formed along the length direction of the vehicle to be extended may be coupled on the dash panel 10.

A front shock absorber housing 40 to mount a shock absorber is disposed between the front side member 20 and the fender apron member 30, a lower part of the front shock absorber housing 40 may be coupled to the front side member 20, and an upper part of the front shock absorber housing 40 may be coupled to the fender apron member 30.

A front shock absorber housing side member 42 may be coupled to an inner surface along the width direction of the vehicle of the front shock absorber housing 40.

The front shock absorber housing side member 42 may be extendedly formed along the height direction of the vehicle, the lower end thereof may overlap and be coupled to the upper part of the front side member 20, and the upper part may be coupled to the cowl cross member 50.

The cowl cross member 50 is formed along the width direction of the vehicle to be extended to be coupled to the upper part of the dash panel 10 and both ends along the width direction of the vehicle may be disposed on the front shock absorber housing 40 to be coupled.

A front pillar 60 formed to be extended in the height direction of the vehicle may be coupled with the fender apron member 40 and the dash panel 10.

As described above, as the front shock absorber housing side member 42 coupled to the front shock absorber housing 40 is coupled to the front side member 20 and the cowl cross member 50, a load input through the front shock absorber housing 40 may be appropriately dispersed to other parts of the vehicle body, when the front small overlap collision accident is generated, an impact energy transmitted to the front side member 20 is dispersed to the cowl cross member 50 and the fender apron member 30 through the shock absorber housing 40, thereby effectively preventing the excessive deformation of the vehicle body by the appropriate dispersion of the impact energy, and the dipping phenomenon is reduced, thereby more securely protecting the passenger.

Figure 3:
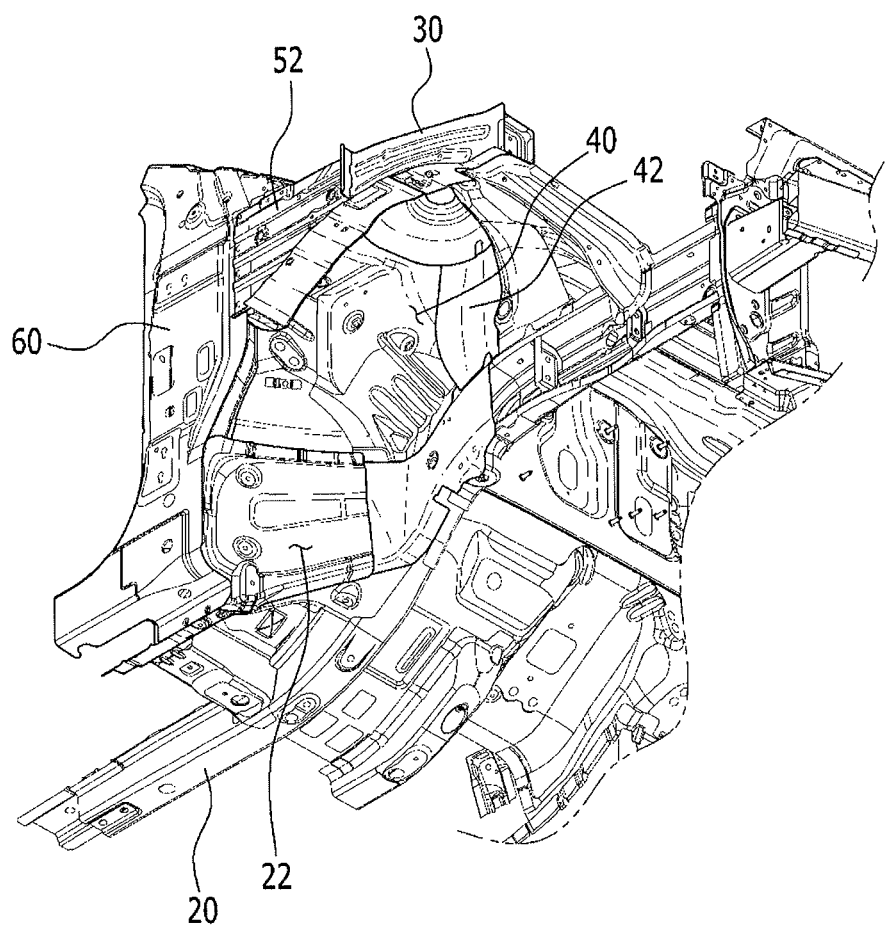
FIG. 3 is a perspective view of a bottom of a front vehicle body reinforcing structure according to various embodiments of the present invention.

Referring to FIG. 3, one end of the front side member rear lower part 22 is formed to be extend from the front side member 20, thereby being coupled to the lower part of the front pillar 60, and the cowl side outer member 52 is attached to the outer side surface along the width direction of the vehicle of the fender apron member 30, thereby being connected to the front pillar 60.

Accordingly, an arched vehicle body structure is formed by the front side member rear lower part 22 and the front pillar 60, the fender apron member 30, and the cowl side outer member 52, when the front collision and a small overlap collision accident of the vehicle are generated, the impact energy transmitted to the front side member 20 is transmitted to the front pillar 60 through the front side member rear lower part 22, the front pillar 60 is pulled upward in the height direction of the vehicle, thereby effectively reducing the dipping phenomenon.

Figure 4:
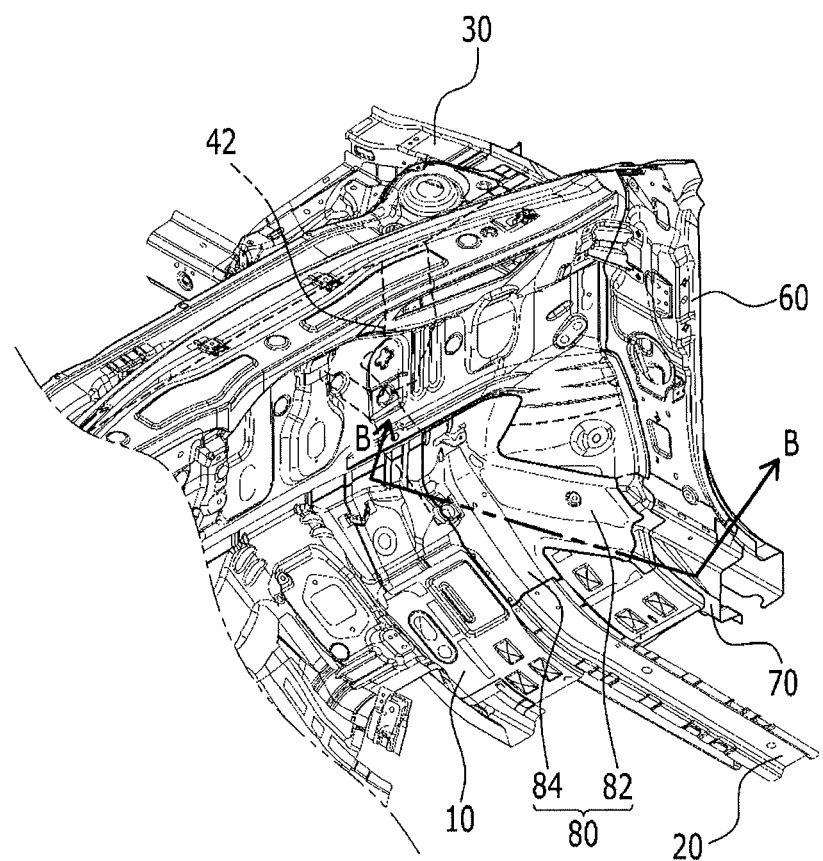
FIG. 4 is a perspective view of a rear of a front vehicle body reinforcing structure according to various embodiments of the present invention.
Figure 5:
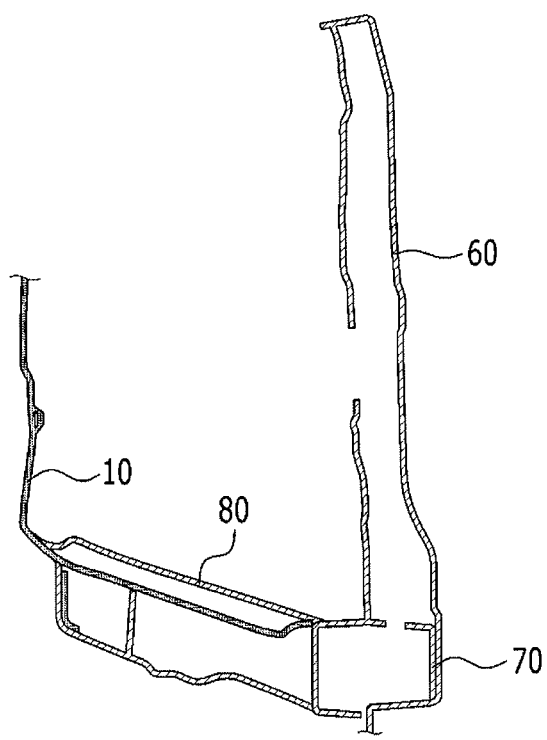
FIG. 5 is a cross-sectional view taken along a line B-B of FIG. 4.

Referring to FIG. 4 and FIG. 5, a dash side lower member 80 may be attached to a rear surface along the length direction of the vehicle of the dash panel 10.

A side sill 70 extendedly formed along the length direction of the vehicle may be coupled to the lower part along the height direction of the vehicle of the front pillar 60.

The dash side lower member 80 is approximately formed of a "" or "Y" character shape, thereby one end 82 thereof is coupled to the side sill 70, in contrast, the other end 84 thereof may overlap the part that the front side member 20 is coupled to the dash panel 10 to be coupled to the dash panel 10.

Accordingly, by a ring structure formed by sequentially connecting the front pillar 60 and the dash side lower member 80, the front shock absorber housing 40, and the fender apron member 30, a structure strength of the front vehicle body is increased such that the passenger may be more securely protected effectively corresponding to the front collision and the front small overlap collision.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure, comprising:
   a dash panel partitioning an engine compartment and a passenger room;
   a front side member extending along a longitudinal direction of a vehicle for coupling to a lower part of the dash panel;
   a fender apron member extending along the longitudinal direction of the vehicle and coupled to an upper part of the dash panel;
   a front shock absorber housing having a lower part coupled to the front side member and an upper part coupled to the fender apron member;
   a cowl cross member extending along a width direction of the vehicle for coupling to the upper part of the dash panel and having both ends overlapping and coupled to the front shock absorber housing along the width direction of the vehicle; and
   a front shock absorber housing side member adhered to an inner surface of the front shock absorber housing along the width direction of the vehicle, and having an upper part coupled to the cowl cross member,
   wherein a front pillar extendedly formed in a height direction of the vehicle is coupled to the fender apron member and the dash panel,
   wherein a first end of a front side member rear lower part extendedly formed at the front side member is coupled to the lower part of the front pillar, and
   wherein a cowl side outer member is coupled to an outer side surface of the fender apron member along the width direction of the vehicle, and the cowl side outer member is connected to the front pillar.

2. The front vehicle body reinforcing structure of claim 1, wherein an arched vehicle body structure is formed by the front side member rear lower part and the front pillar, the fender apron member, and the cowl side outer member.

3. The front vehicle body reinforcing structure of claim 1, wherein a side sill extendedly formed along the longitudinal direction of the vehicle is coupled to the lower part of the front pillar along the height direction of the vehicle.

4. The front vehicle body reinforcing structure of claim 3, wherein a dash side lower member is coupled to a rear surface of the dash panel along the longitudinal direction of the vehicle.

5. The front vehicle body reinforcing structure of claim 4, wherein the dash side lower member is formed in a "Y" shape.

6. The front vehicle body reinforcing structure of claim 4, wherein a first end of the dash side lower member is coupled to the side sill, and a second end of the dash side lower member overlaps a part to which the front side member is coupled to the dash panel for coupling to the dash panel.

7. The front vehicle body reinforcing structure of claim 4, wherein the vehicle body structure of a ring shape is formed by sequentially connecting the front pillar and the dash side lower member, the front shock absorber housing, and the fender apron member.

* * * * *